United States Patent
McCaslin et al.

[11] 3,865,449
[45] Feb. 11, 1975

[54] GARBAGE ENCLOSURE
[76] Inventors: Sadler C. McCaslin; Wilbur J. Smith, both of Phoenix, Ariz.
[22] Filed: Mar. 2, 1972
[21] Appl. No.: 231,098

[52] U.S. Cl. .............................................. 312/352
[51] Int. Cl. ........................................... A47b 97/00
[58] Field of Search........ 312/301, 314, 100, 317 R, 312/317 A, 250, 270, 352; 214/16.1 R, 16.1 C, 16.1 CA, 16.1 OB

[56] References Cited
UNITED STATES PATENTS

| | | | |
|---|---|---|---|
| 2,238,193 | 4/1941 | Stephens | 312/317 R |
| 2,506,448 | 5/1950 | Gregor | 312/317 A |
| 3,101,981 | 8/1963 | McCally | 312/317 R |
| 3,179,292 | 4/1965 | Terry | 312/317 A |
| 3,378,323 | 4/1968 | Goldberg | 312/270 |

*Primary Examiner*—James T. McCall
*Attorney, Agent, or Firm*—Martin L. Stoneman 1. A garbage enclosure comprising:
   a. A generally box-like enclosure having an opening in one wall thereof and being otherwise closed;
   b. A movable cart including:
     (1) A generally horizontal base member constructed and arranged for carrying at least one garbage container; and
     (2) A generally vertical rear member constructed and arranged to close said opening when said movable cart is moved into said generally box-like enclosure.
   c. Said garbage enclosure including a locking device constructed and arranged to maintain said rear vertical member in said opening;
   d. Said generally box-like enclosure including a first bug barrier adjacent its bottom, said first bug barrier comprising an angle attachment extending from about a forty-five-degree angle to about a sixty-degree angle downward from the horizontal;
   e. Said movable cart including a second bug barrier around the circumference from said generally horizontal base member, said second bug barrier comprising an angle attachment extending from about a forty-five-degree angle to about a sixty-degree angle downward from the horizontal;
   f. Said movable cart including wheels; and
   g. The border of said generally vertical rear member and the border of said opening being constructed and arranged to provide a seal when said generally vertical rear member is moved into said opening, said borders comprising matched angle attachments.

1 Claim, 9 Drawing Figures

INVENTOR.
Sadler C. McCaslin
BY Wilbur J. Smith
*Martin L. Stoneman*
ATTORNEY

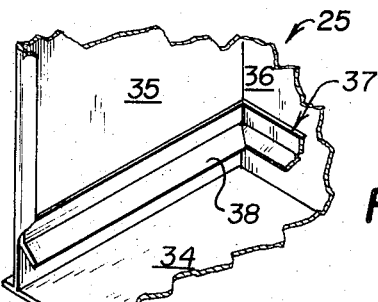
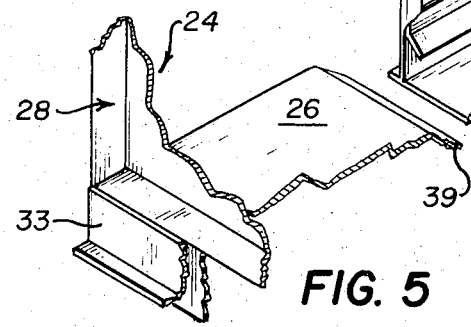
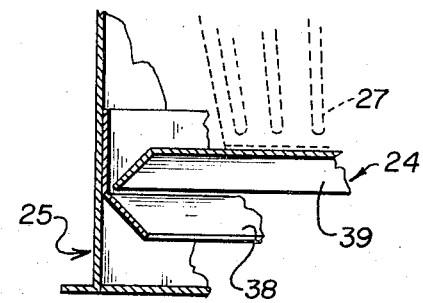
FIG. 4
FIG. 5
FIG. 6
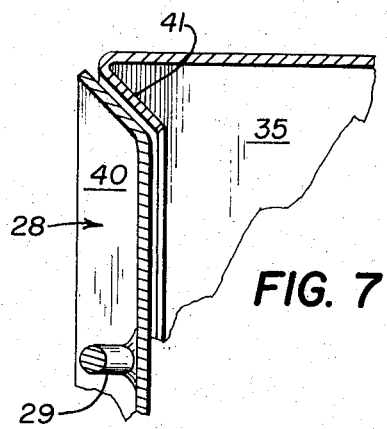
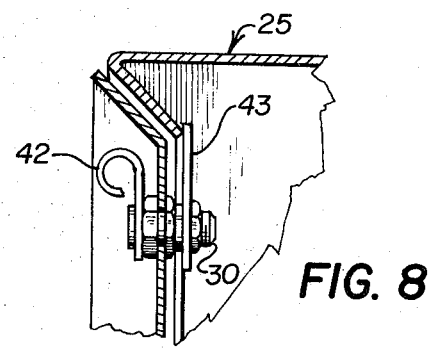
FIG. 7
FIG. 8
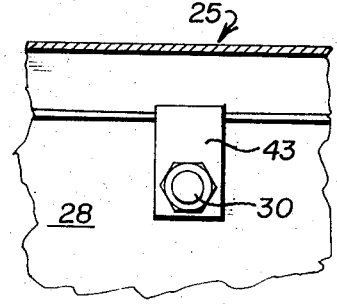
FIG. 9
INVENTOR.
Sadler C. McCaslin
BY Wilbur J. Smith
ATTORNEY

GARBAGE ENCLOSURE

BACKGROUND OF THE INVENTION

This invention relates to garbage enclosures.

More particularly, the invention concerns a garbage enclosure comprising a generally box-like container having one open wall and a garbage-can-carrying cart, the rear of which provides a sealing wall for said garbage enclosure.

In a further aspect, the invention concerns a garbage enclosure especially adapted to remain relatively free of flies, bugs and germs and to keep trash and garbage from being spread around in an unwanted way, such as by animals or children.

It has been a problem, in the handling of garbage and trash containers for residences and small commercial establishments, to place the common type of garbage or trash can in the places or locations where there will be convenient access both to persons emptying garbage into the cans and to persons whose duty it is to regularly empty such containers. Even when the desired convenience is accomplished, the same is normally not accomplished in an aesthetic manner nor in a manner calculated to minimize the problem and presence of bugs, insects and the like.

Furthermore, it is well known that exposed garbage cans of the type described often present attractive nuisances to animals and small children and it is not uncommon that the contents of such cans are frequently littered about in an unsanitary, odorous, and non-aesthetic manner. It is also well realized that exposed garbage containers will be subject to the mercy of the weather and will often be toppled over by strong winds and rusted by rain.

It would be highly advantageous, therefore, to provide a garbage enclosure which is relatively impervious to bugs and insects, which may be sealed, which hides the garbage cans and containers in an aesthetic manner, and which provides for easier handling of garbage in an efficient manner.

SUMMARY OF THE INVENTION

Accordingly it is the primary object of the present invention to provide an improved garbage enclosure.

Another object of the present invention is the provision of a garbage enclosure adapted to seal garbage containers in a protective and aesthetic manner.

Still another object is to provide a garbage enclosure which is not readily accessable to bugs, insects and the like.

Yet still another object of the present invention is the provision of a garbage enclosure of the above type which is efficient in the handling of garbage containers, relatively inexpensive to manufacture, and having a high degree of durability and serviceability.

Briefly, to accomplish the desired objectives of the present invention in accordance with a presently preferrred embodiment thereof, there is provided a generally box-like enclosure, but having all or part of one wall open. A readily movable cart is provided which is adapted to carry garbage containers and to be moved into the box-like enclosure. The cart includes a generally horizontal base member adapted to carry garbage containers and generally vertical rear wall-like member adapted to fill and seal the wall opening of the box-like enclosure when the cart is moved into the enclosure.

Those well versed in the habits and capabilities of bugs and insects have learned that certain geometric paths are extremely difficult, if not impossible, for bugs and insects to cross. More specifically, it has been learned that, to a bug or insect attempting to climb or scale a wall or other structure, a barrier erected at approximately a 45° to 60° angle downward from the horizontal provides an effective barrier for such bugs. The present invention includes such a barrier along the bottom of the box-like enclosure and around the circumference of the generally rectangular essentially-horizontal base member of the cart. The cart is provided with wheels so that the same is easily movable and so that garbage containers resting on the base of the cart may be handled and used outside of the box-like enclosure; yet when such garbage and trash cans are placed on the base of the cart they may be moved or wheeled on the cart into the box-like enclosure of the present invention.

BRIEF DESCRIPTION OF THE DRAWINGS

Further and more specific objects and advantages of the present invention will become readily apparent to those skilled in the art from the following detailed description thereof taken in connection with the drawings, in which:

FIG. 4 is a perspective view, partially in section, illustrating a portion of the interior of the box member of the present invention, showing in detail the bug barrier therein;

FIG. 5 is a perspective view, partially in section, illustrating in detail the construction of the base and rear wall of the cart member of the present invention;

FIG. 6 is a perspective view, partially in section, showing the relative geometric placement between the bug barrier of the cart of the present invention and the bug barrier of the box of the present invention when the present invention is in its closed condition;

FIG. 7 is a perspective view, partially in section, illustrating the manner in which the rear of the cart acts as a sealing member of the present invention when opposed to the box member of the present invention; FIG. 8 is a side view, partially in section, illustrating a preferred embodiment of a locking device to seal the preferred embodiment of the present invention when it is in its closed position; and FIG. 9 is a partial elevational view, illustrating for the sake of clarity the inside portion of the locking device of FIG. 8 shown in locked position.

DETAILED DESCRIPTION OF THE PREFERRED EMBODIMENT

Figure 1:
FIG. 1 is an artistic view of the garbage enclosure chosen for purposes of illustrating a presently preferred embodiment of the invention, shown located exterior to a building.

Turning now to the drawings, in which the same reference numerals indicate corresponding elements throughout the several views, FIG. 1 illustrates the presently preferred garbage enclosure 21 shown in a closed position adjacent a residence or building 22. A mail box 23, or similar other accoutrement may for convenience be positioned, as illustrated, atop garbage enclosure 21.

Figure 2:
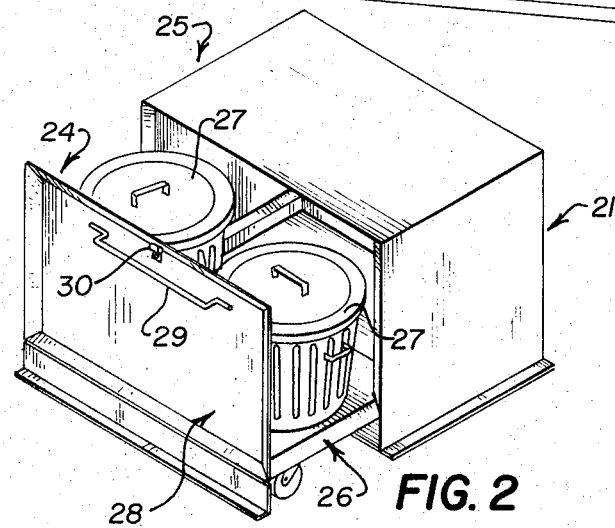
FIG. 2 is a perspective view of the illustrated preferred embodiment of the present invention, showing the same in a half open position.

FIG. 2 further illustrates garbage enclosure 21 in a partially open position, showing cart member 14 partially removed from box member 25. Shown positioned on the base 26 of cart member 24 are garbage containers 27. The rear member 28 of cart member 24 includes a handle 29, and locking device 30.

Figure 3:
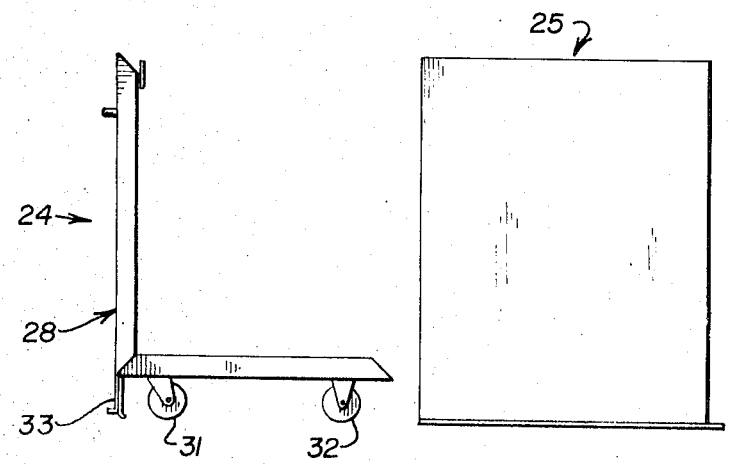
FIG. 3 is a side view showing the cart of the present invention stationed exterior of the box of the present invention.

FIG. 3 shows cart member 24 totally removed from box member 25 and the exterior of box member 25 and illustrates preferred positions for the sets of wheels 31 and 32. It is preferred that wheels 31 be swivel castors and wheels 32 be rigid castors; and the mounting of wheels 31 and 32 may be done in many manners well known in the art. Extending below rear member 28 is drape member 33, which, taken together with rear member 28, provides an exterior wall to seal the garbage enclosure 21 when cart member 24 is totally inserted into box member 25.

The interior construction of box member 25 is illustrated by FIG. 4, in which can be seen portions of floor 34 of box member 25, sidewall 35 of box member 25, and rear wall 36 of box member 25. Bug barrier 37 extends around the interior of both sidewalls 35 and rear wall 36 of box member 25 in a continuous manner parallel to floor 34 and above floor 34, essentially as shown. Bug barrier 37 includes angle portion 38 which is affixed to sidewalls 35 and rear wall 36 and extends inwardly from said walls in a direction 45° down from the horizontal.

FIG. 5 illustrates portions of the detailed configuration of cart member 24, especially drape member 33. An angle portion 39 of base 26 extends outwardly from base 26 around the entire periphery of base 26. Angle portion 39 extends in a direction approximately 45° down from the horizontal and acts as a bug barrier against bugs and insects which may be situated beneath base 26.

FIG. 6 illustrates the relative disposition of angle portion 39, which is the bug barrier of cart member 24 and angle portion 38, which acts as a bug barrier of box member 25, when cart member 24 is inserted in box member 25. It is seen that angle portion 39 is above and immediately adjacent angle portion 38 and that both together will operate as an effective bug barrier against bugs and insects under those portions being able to get into the interior proper of the garbage enclosure 21 illustrated as a preferred embodiment. Shown in dotted lines in FIG. 6 is the relative position that a garbage container 27 would have in relation to the bug barriers described.

In order to seal garbage enclosure 21 effectively, it is necessary and desired that rear member 28, around its periphery, match and mate with the periphery of the described opening in box member 25. Illustrated in FIG. 7 is a preferred embodiment of the way in which those parts are matched and mated to provide a seal, as against bugs and insects. A peripheral angle portion 40 around rear member 28 (shown also is handle 29) is designed to butt up against a peripheral angle portion 41 around the periphery of the opening in box member 25. The matching of the angles of such members can be accomplished in ways well known in the art.

FIG. 8 illustrates a preferred embodiment of the latch or locking device 30 and illustrates how, in ways well known in the art, the turning of handle 42 from the exterior of rear member 28 of cart member 24 will put locking plate 43 in an interference position with a portion of box member 25 to effectively lock and unlock the ability of cart member 24 to move in and out of box member 25.

FIG. 9 shows the locking device 30 looking from the interior of box member 25 and shows locking plate 43 in said interference position with box member 25.

Various changes in the device herein shown for the purposes of illustration will readily occur to persons skilled in the art. Such modifications and variations, while not explicitly denoted in the foregoing detailed description of the preferred embodiment, do not deviate from the teachings of the present invention and are intended to be included in the spirit and scope thereof, and the scope of the present invention is intended to be limited only by a fair interpretation of the following claims.

Having fully described the invention in such manner as to enable those skilled in the art to understand and practice the same, what is claimed is:

1. A garbage enclosure comprising:
   a. A generally box-like enclosure having an opening in one wall thereof and being otherwise closed;
   b. A movable cart including:
      1. A generally horizontal base member constructed and arranged for carrying at least one garbage container; and
      2. A generally vertical rear member constructed and arranged to close said opening when said movable cart is moved into said generally box-like enclosure.
   c. Said garbage enclosure including a locking device constructed and arranged to maintain said rear vertical member in said opening;
   d. Said generally box-like enclosure including a first bug barrier adjacent its bottom, said first bug barrier comprising an angle attachment extending from about a 45° angle to about a 60° angle downward from the horizontal;
   e. Said movable cart including a second bug barrier around the circumference from said generally horizontal base member, said second bug barrier comprising an angle attachment extending from about a 45° angle to about a 60° angle downward from the horizontal;
   f. Said movable cart including wheels; and
   g. The border of said generally vertical rear member and the border of said opening being constructed and arranged to provide a seal when said generally vertical rear member is moved into said opening, said borders comprising matched angle attachments.

* * * * *